(12) United States Patent
Igoe et al.

(10) Patent No.: US 6,833,925 B1
(45) Date of Patent: Dec. 21, 2004

(54) COMPOSITE JOB TICKETS TO SUPPORT PROOFING

(75) Inventors: Patrick T. Igoe, Grand Island, NY (US); Michael P. Kirby, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/420,637

(22) Filed: Oct. 21, 1999

(51) Int. Cl.$^7$ .......................... G06F 15/00; G06F 17/00
(52) U.S. Cl. ................ 358/1.15; 358/1.15; 358/1.14; 235/375
(58) Field of Search ................ 358/1.15, 1.9, 358/1.18; 235/375; 399/84

(56) References Cited

U.S. PATENT DOCUMENTS 5,923,013 A * 7/1999 Suzuki et al. ............... 235/375
6,330,071 B1 * 12/2001 Vidyanand ................. 358/1.15
6,476,930 B1 * 11/2002 Roberts et al. ............. 358/1.18

* cited by examiner

Primary Examiner—Kimberly Williams
Assistant Examiner—Saeid Ebrahimi
(74) Attorney, Agent, or Firm—Fay, Sharpe, Fagan, Minnich & McKee, LLP

(57) ABSTRACT

An image reproduction system enables an operator to switch between different sets of finishing instructions by switching a shadow job ticket between an active state and an inactive state. Ticket management software assembles a composite job ticket having finishing instructions and provides those instructions to a printer. If the shadow job ticket is in its active state, finishing instructions from a base job ticket are superceded by corresponding instructions from the shadow job ticket. If the shadow job ticket is in its inactive state, the ticket management software assembles a composite job ticket without using the shadow job ticket.

18 Claims, 5 Drawing Sheets

COMPOSITE JOB TICKETS TO SUPPORT PROOFING

This invention relates to image reproduction systems, and in particular, to systems for controlling the finishing parameters associated with a print job.

BACKGROUND

In conventional image reproduction systems, a document author initiates the process of printing a document by first creating a PDL file. This file typically includes the document content encoded in a page description language ("PDL"). The author then creates a print job by associating a job ticket with this PDL file. This job ticket includes several data fields identifying the print job and carrying information about how to finish the print job. For example, if the printed output is to be stapled, collated or printed on special stock, this information is typically found in corresponding fields on the job ticket. The print job, with the job ticket and its accompanying PDL file, is then transmitted to a control stage associated with a printer.

At the control stage, the author's print job is placed in a print queue, together with print jobs from other users of the printer. Once the author's print job moves to the top of the print queue, job management software running on the control stage decomposes the PDL file associated with the author's print job. This decomposition process transforms the PDL file into a sequence of byte maps, each of which represents a page in the author's document. These byte maps are then sent to the printer to be printed and finished in a manner consistent with the instructions specified n the various fields on the job ticket.

Because of the costs associated with printing large or complex jobs, it is common practice to prepare proof copies before committing to a production run. These proof copies are typically printed in limited numbers and on low-cost stock with certain finishing options disabled and other printing options remaining the same. Since the job ticket specifies the finishing options, it follows that the job ticket used for the production run is different from the job ticket used to print proofs.

As noted above, the job ticket is associated with a PDL file to form a print job which is then transmitted to the control stage of the image reproduction system. Once the print job has reached the control stage, it is no longer practical to change the finishing parameters on the job ticket. Moreover, even if one could reprogram the job ticket at the printer to turn a production job into a proof job, it is unrealistic to expect the operator at the printer to perform such an elaborate procedure.

Even if the operator were to reprogram the job ticket as described above, the finishing parameters supplied by the author would be lost. In order to later recover these original finishing parameters, the operator would have to carefully undo all changes made to the job ticket in the course of reprogramming it. This is an error prone procedure which, if performed incorrectly, can result in expensive errors. For example, an error in undoing all changes may result in an entire production run being printed on the wrong stock.

Because of the foregoing limitation in conventional image reproduction systems, the author prints proofs by preparing a proof job ticket, attaching it to the PDL file, and sending the resulting print job to the control stage. Then, to make the production run, the author prepares a production job ticket, attaches it to the same PDL file, and then sends the resulting production job to the control stage. It is apparent, therefore, that the author routinely sends the same PDL file to the control stage twice, first with a proof job ticket and second with a production job ticket. Because PDL files can be extremely large, the transmission of a PDL file to the control stage is a time-consuming operation. The retransmission of a PDL file to a control stage that already has the identical PDL file stored within it is thus an extremely wasteful use of computation resources.

In most cases, the production job ticket differs from the proof job ticket in only a few data fields. For example, the field specifying the number of copies and the field specifying the type of stock are likely to differ but many other fields are likely to remain the same. As a result, the creation of two separate job tickets involves many instances of specifying the same finishing parameter in both the proof job ticket and the production job ticket. Given the number of finishing options available in a modern image reproduction system, this task is burdensome and prone to error.

There is thus a need in the art to provide a method and system for changing the finishing parameters on a job ticket after the print job has already been transmitted to the control stage of the image reproduction system.

SUMMARY

The method of the invention addresses the problem of quickly and easily switching between different sets of finishing instructions by associating, with a print job, a base job and a shadow job ticket. The base job ticket and the shadow job ticket are then used in the assembly of a composite job ticket.

In a preferred embodiment, the base job ticket includes a base data field having finishing instructions, and a shadow job ticket having a corresponding shadow data field. If the corresponding shadow data field includes finishing instructions, those finishing instructions are used in a corresponding composite data field in the composite job ticket. The instructions in a shadow job ticket are therefore used to override, for the purposes of proofing, corresponding instructions in the base job ticket.

The shadow job ticket can be in either an active state or an inactive state. If the shadow job ticket is in its inactive state, it is ignored in the assembly of a composite print job. Conversely, if the shadow job ticket is in its active state, the instructions found in the shadow job ticket are used to override corresponding instructions in the base job ticket. The shadow job ticket can be switched from its active state to its inactive state, and vice versa, by an operator at an output stage of an image reproduction system. In this way, one can quickly and easily switch between two sets of finishing instructions.

In operation a base job ticket and a shadow job ticket are associated with each other at the input stage and transmitted, either together or separately, to a control stage of an image reproduction system. On the basis of this association, the control stage executes software that generates a composite job ticket. If the shadow job ticket is in its active stage, this composite job ticket includes finishing instructions selected from the base job ticket and the shadow job ticket. If the shadow job ticket is in its inactive stage, the composite job ticket includes instructions selected from only the base job ticket.

In a typical application of the method of the invention, the base job ticket specifies finishing instructions for the production run of a print job and the shadow job ticket includes those finishing instructions that are to be changed in order to form a set of instructions for printing proof copies of the print job. Alternatively, the base job ticket can specify the finishing instructions for a proof run and the shadow job ticket can specify those finishing instructions that are to be changed to form finishing instructions for the production run. In either case, an operator at the control stage of the image reproduction system can readily switch between finishing instructions for a production run and finishing instructions for a proof run by simply switching the shadow job ticket between its active state and its inactive state. This feature of the invention eliminates the need to retransmit the print job with a different job ticket in order to switch between a proof run and a production run and does so without requiring the operator to reprogram a job ticket.

The method of the invention also includes the use of multiple job tickets which can be switched from one state to another independently of each other. By switching different combinations of shadow job tickets to their respective active states, an operator can easily switch between several different sets of finishing parameters.

BRIEF DESCRIPTION OF FIGS

These and other advantages and features of the invention will be made apparent in the following detailed description and in the accompanying figures in which.

DETAILED DESCRIPTION

The present invention provides an efficient, cost effective manner of associating, correlating or matching revisions to a job ticket associated with a print job even after that print job has already been dispatched to an image reproduction system. The system of the present invention can be employed in a number of different types of image reproduction systems, examples of which include electrophotographic, electrostatic, ionographic, and other types of image forming or reproduction systems, that are adapted to capture and/or store image data associated with a particular object, such as a document. The system of the present invention is intended to be implemented in a variety of environments, such as in any of the foregoing types of image reproduction systems, and is not limited to the specific image reproduction systems described herein.

Figure 1:
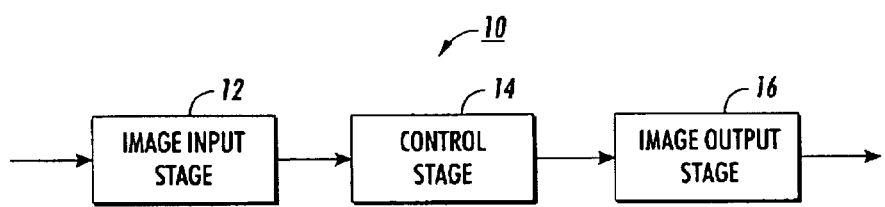
FIG. 1 shows a general image reproduction system for practice of the invention.

One broad example of a general image forming or reproduction system suitable for employing the system of the invention is illustrated in FIG. 1. The illustrated image reproduction system 10 includes an image input stage 12 that is adapted to acquire, receive, or generate an image of a document. The image data associated with the acquisition of the document image is then transferred to a control stage 14. This control stage 14 can include associated control circuitry, software for managing image data, and storage for storing the image data. In the embodiment described herein, the control stage 14 is implemented on a server. The control stage also includes an arrangement for controlling the transfer of image data to an image output stage 16. The illustrated image output stage 16 can include any suitable apparatus for reproducing the image on a substrate, such as a conventional printer or copier, both of which are known and well characterized in the art.

The image reproduction system 10 is not limited to the system or arrangement of system components shown in FIG. 1. Rather, the image reproduction system 10 can use a subset of the components illustrated in FIG. 1, such as only the image acquisition stage, the control stage (such as in the form of a server), or the image output stage, or any number of different types of components or arrangement of components. The image reproduction system 10 can also be any type of image reproduction system, examples of which include electrophotographic, electrostatic, ionographic, and other types of image forming or reproduction systems that are adapted to acquire, receive, retrieve and/or store image data associated with a particular object.

Figure 2:
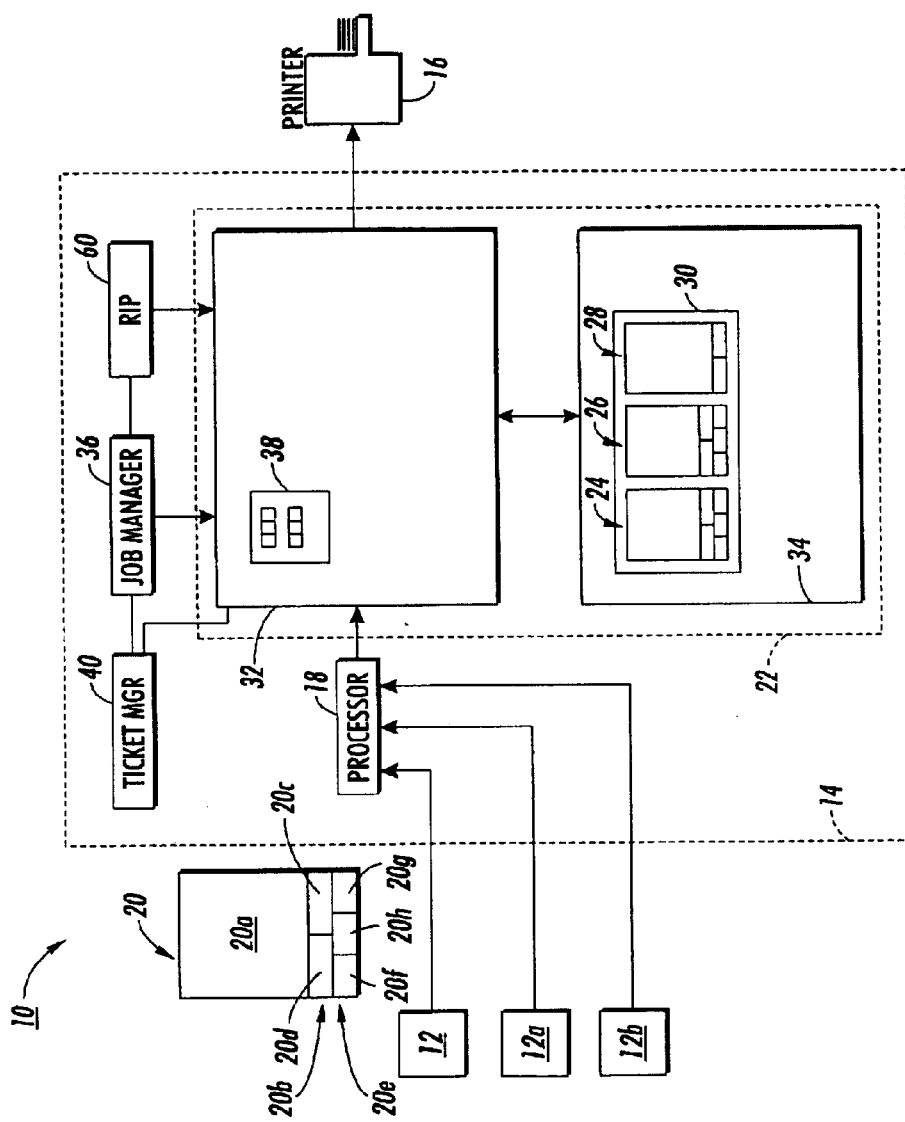
FIG. 2 depicts the control stage of FIG. 1 installed in a system that includes one or more image input stages and one image output stage.

Referring to FIG. 2, which shows an exemplary image reproduction system 10 in more detail, the control stage 14 includes a processor 18 that receives, from an image input stage 12, a print job 20 to be queued for printing.

The print job 20 is formed by the association of document content 20a, encoded in the form of a PDL file, with a base job ticket 20b that carries information relating to non-content related parameters for processing the print job 20. These parameters, which include finishing instructions such as whether or not the printed document is to be stapled, or what type of paper the printed document is to be printed on, are encoded in one or more base data fields 20c on the base job ticket 20b. The base job ticket 20b also includes a job name field 20d carrying information identifying the print job 20.

The base job ticket 20b is accompanied by a shadow job ticket 20e having a job name field 20f for carrying information identifying the print job 20. However, because the shadow job ticket 20e identifies its associated print job, it need not accompany the base job ticket 20b or the print job 20. Instead, the shadow job ticket 20e can be provided to the control stage 14 separately, at any time before the finishing instructions for the print job 20 identified by the shadow job ticket 20e are sent to the image output stage 16.

In addition to the job name field 20f, the shadow job ticket 20e also includes one or more shadow data fields 20g that include shadow job finishing instructions. These shadow data fields 20g correspond to the base data fields 20c of the base job ticket 20b. In some cases, a shadow data field 20g carries a finishing instruction that contradicts (e.g., is different from) or supplements a finishing instruction from the corresponding base data field 20c. In other cases, a shadow data field 20g corresponding to a base data field 20c is empty, in which case there is no contradiction or supplementation of the base job finishing instruction found in the corresponding base data field 20c.

In the context of this specification, the term "association" refers to a process by which one object identifies another. This process can be implemented in a variety of ways that will be apparent to those of ordinary skill in the art. In the preferred embodiment, when a base job ticket is associated with a particular PDL file, the base job ticket includes information identifying that PDL file. Similarly, in the preferred embodiment, when a shadow job ticket is associated with a base job ticket, the shadow job ticket includes information identifying the base job ticket with which it is associated.

The shadow job ticket 20e also includes a flag 20h that indicates whether the shadow job ticket 20e is in an active state or in an inactive state. This flag 20h can be switched from one state to another by either the author, before the shadow job ticket 20e is transmitted to the control stage 14, by an operator, after the shadow job ticket 20e has been transmitted to the control stage 14, or by any other means obvious to those of ordinary skill in the art.

In a typical installation, the control stage 14 is in network communication with one or more image input stages 12, 12a–b, all of which can send print jobs, as well as shadow job tickets associated with previously sent print jobs, to the control stage 14. However, the control stage 14 can also be installed to communicate directly with a single user. Alternatively, the control stage 14 can be adapted to perform the function of an image input stage directly, in which case a document author interacts directly with the control stage 14 to create the print job 20 by associating the document content 20a with the base job ticket 20b.

A storage element 22 in communication with the processor 18 stores the print job 20, together with one or more other print jobs 24, 26, 28, in a print queue 30. It is preferable that the storage element 22 include a first memory element 32, such as a random access memory (RAM). However, because print jobs can be extremely large, the storage element 22 typically also includes a second memory element 34 for mass storage of print jobs that, because of their position in the print queue 30, are not to be printed for some time. Those of ordinary skill will recognize that other storage arrangements can be employed in addition to or instead of the arrangement illustrated in FIG. 2. The illustrated control stage 14 can include a storage element 22 having any suitable storage media for storing the image data to create a database of images. Examples of such storage media include RAM, ROM, and the like. Preferably, the storage element 22 includes one or more magnetic storage devices, such as a hard disk.

A job manager 36 in communication with the storage element 22 controls the placement of individual print jobs 24, 26, 28 in the print queue 30. Among the functions of the job manager 36 is to match any shadow job tickets present in a ticket cache 38 with print jobs present in either the print queue 30 or elsewhere in the storage element 22 and to provide the result of this matching process to a ticket manager 40.

In response to information provided by the job manager 36, the ticket manager 40 assembles a composite job ticket for each print job by combining the base job ticket for the print job and any associated shadow job tickets. This composite job ticket carries finishing instructions selected from either the base job ticket or, if one exists, the shadow job ticket. It is the finishing instructions on the composite job ticket, and not those on the original base job ticket, that are used in subsequent processing of the print job.

Those of ordinary skill will recognize that the phrase "composite job ticket" as used herein is intended to include either the construction of a discrete job ticket separate from both the base job ticket and from the shadow job ticket, or the modification of the base job ticket based on the contents of the shadow job ticket. It is preferable, however, to construct a discrete composite job ticket rather than to modify the base job ticket since this avoids loss of information carried by the base job ticket.

Figure 3:
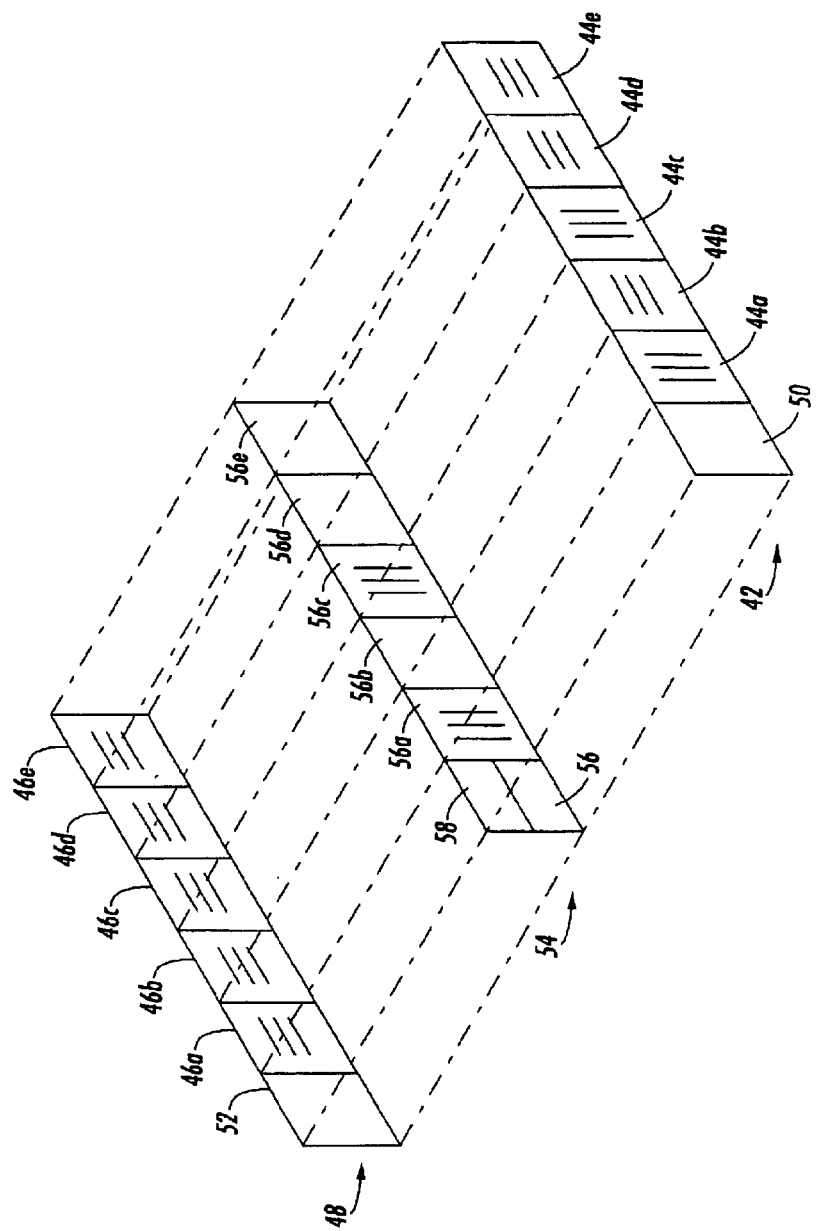
FIG. 3 illustrates the manner in which a composite job ticket is assembled from a base job ticket and a shadow job ticket.

As illustrated in FIG. 3, an exemplary composite job ticket 42 assembled by the ticket manager 40 includes one or more composite data fields 44a–e, each of which corresponds to a base data field 46a–e in a base job ticket 48. The composite job ticket 42 further includes a job name field 50 that identifies the same print job as that identified by a job name field 52 in the base job ticket 48.

In the absence of any shadow job ticket, the content of each composite data field 44a–e is the same as the content of the corresponding base data field 46a–e. However, in some cases, there may exist, as shown in FIG. 3, a shadow job ticket 54 that has a job name field 56 identifying the same print job as that identified by the job name field 52 of the base job ticket 48. Such a shadow ticket can be sent to the control stage 14 concurrently with the base job ticket. Alternatively, a shadow job ticket can be sent separately and stored in the ticket cache 38 in the storage unit 22 until it is retrieved by the ticket manager 40.

In either case, the shadow job ticket 54 includes shadow data fields 56a–e that correspond to the base data fields 46a–e. These shadow data fields can either carry instructions, as indicated in the first and third shadow data fields 56a, 56c, or they can be empty, as indicated by the second, fourth and fifth shadow data fields 56b, 56d, 56e.

A flag 58 indicates whether the shadow job ticket 54 is in an active state or in an inactive state. If the shadow job ticket 54 is in an inactive state, the ticket manager 40 ignores the existence of the shadow job ticket. In the resulting composite job ticket, each composite data field carries an instruction that corresponds to an instruction in the base data field. However, if, as shown in FIG. 3, the flag 58 indicates that the shadow job ticket 54 is in an active state, the instruction carried by each composite data field 44a–e is either the instruction in the corresponding base field 46a–e, if the corresponding shadow data field is empty, or the instruction carried by the shadow data field 56a–e otherwise. As shown in FIG. 3, the second, fourth and fifth shadow data fields 56b, 56d, 56e are empty. Hence the finishing instructions in the second, fourth and fifth composite data fields 44b, 44d, 44e are those that are in the second, fourth and fifth base data fields 46b, 46d, 46e. The finishing instructions in the first and third composite data fields 44a, 44c are those that are in the first and third shadow data fields 56a, 56c.

Referring again to FIG. 2, the job manager 36 is also in communication with a raster image processor ("RIP") 60 that generates a printer-readable representation of a print job's document content. The process carried out by the raster image processor 60, referred to as "decomposition," transforms the document content of a print job from a pre-decomposition state, in which it is represented by a PDL file, to a post-decomposition stage in which the document content is translated into a sequence of byte-maps representative of page images. The resulting decomposed print job can then be transmitted to the image output stage 16, which will hereafter be referred to as a "printer," upon instructions from the job manager 36. On the basis of the document content represented by the byte maps of the decomposed print job and the finishing instructions provided on the composite job ticket, the printer 16 produces a finished printed document 46.

The job manager 36, the ticket manager 40, and the raster image processor 60 are typically implemented as software running on the control stage 14 and having access to the print jobs and associated job tickets stored in the storage element 22.

Figure 4:
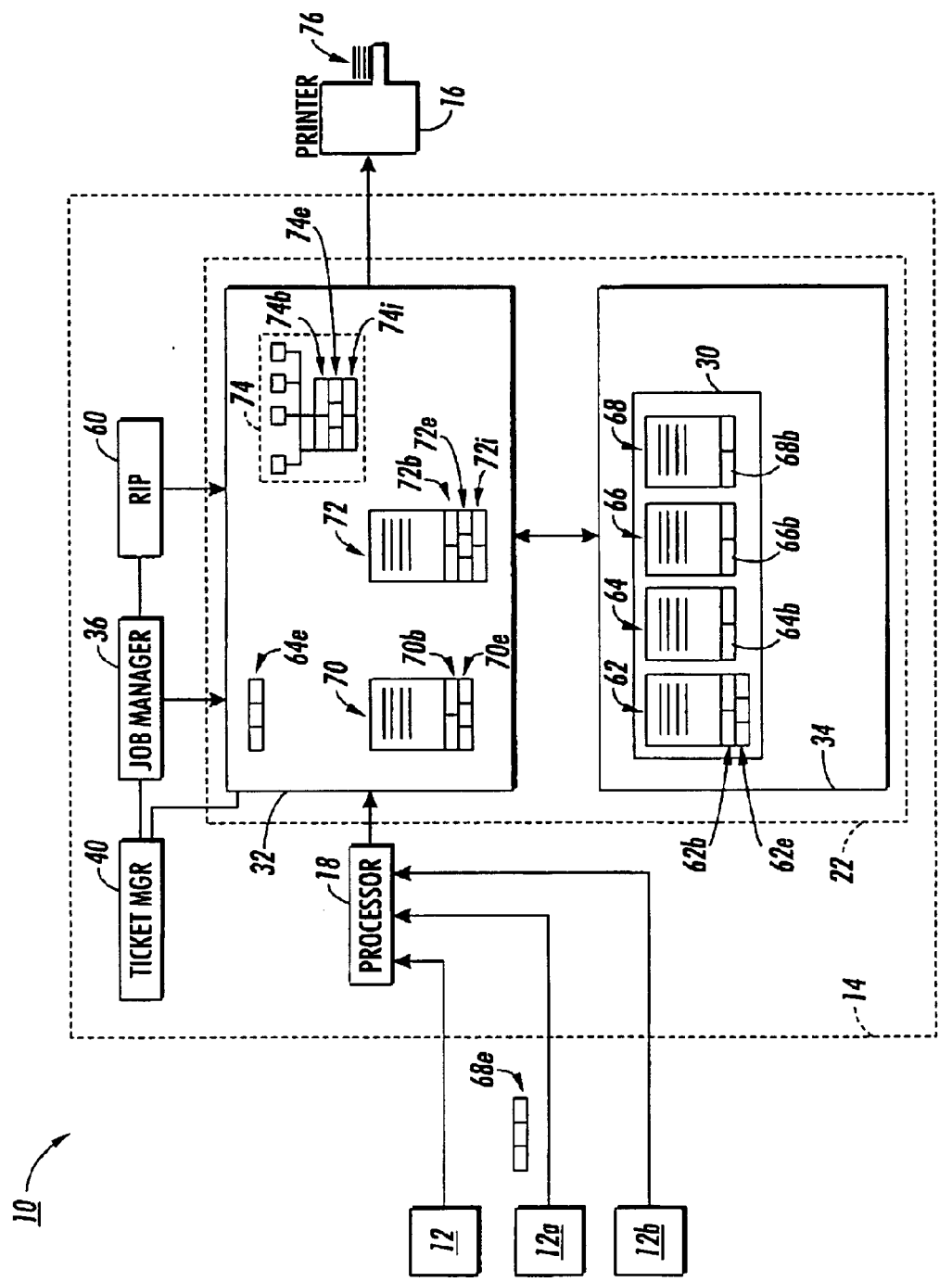
FIG. 4 shows the control stage of FIG. 2 with print jobs in various stages of processing.

FIG. 4 shows the control stage 14 of FIG. 2 with print jobs in various stages of processing. As shown in the figure, four print jobs are stored in the print queue 30 and awaiting further processing. The first print job 62 includes a base job ticket 62b and a shadow job ticket 62e. The second print job 64 includes only a base job ticket 64b. However, a shadow job ticket 64e identifying this second waiting print job 64 is stored in the ticket cache 38. This shadow job ticket 64e will be retrieved by the ticket manager 40 and used to assemble a composite job ticket for this second print job 64. The third print job 66 has a base job ticket 66b but no shadow job ticket. Hence, the composite job ticket for this third print job 66 will carry finishing instructions identical to those in its base job ticket 66c.

FIG. 4 also shows a detached shadow job ticket 68e that is being sent to the control stage 14 without being attached to any print job. This detached shadow job ticket 68e identifies a fourth print job 68 in the print queue 30. Upon arrival at the control stage 14, the detached shadow job ticket 68e will be placed into the ticket cache 38 to await retrieval by the ticket manager 40 for use in assembling a composite job ticket for the fourth print job 68.

A fifth print job 70 has been fetched from the print queue 30 and is awaiting processing of its base job ticket 70b and its shadow job ticket 70e by the ticket manager 40 in the manner discussed in connection with FIG. 3. A sixth print job 72 has been processed by the ticket manager 40 and consequently has a composite job ticket 72i having instructions selected from a base job ticket and one or more shadow job tickets. This sixth print job 72 is now awaiting decomposition by the raster image processor 60. A seventh print job 74 having a composite job ticket 74i has already been decomposed by the raster image processor 60 and is now in byte-map form awaiting transmission to the printer 16. Finally, a last print job 76 has been finished in accordance with instructions in its composite job ticket and is now in the output hopper of the printer 16 awaiting delivery to the customer.

It will be appreciated by one of skill in the art that the order of certain steps can be changed. In particular, the assembly of the composite job ticket by the ticket manager 40 can occur before or after decomposition of a print job. Because of the significant amount of time required to decompose a print job, it is advantageous to assemble the composite job ticket concurrently with the decomposition of the print job.

Figure 5:
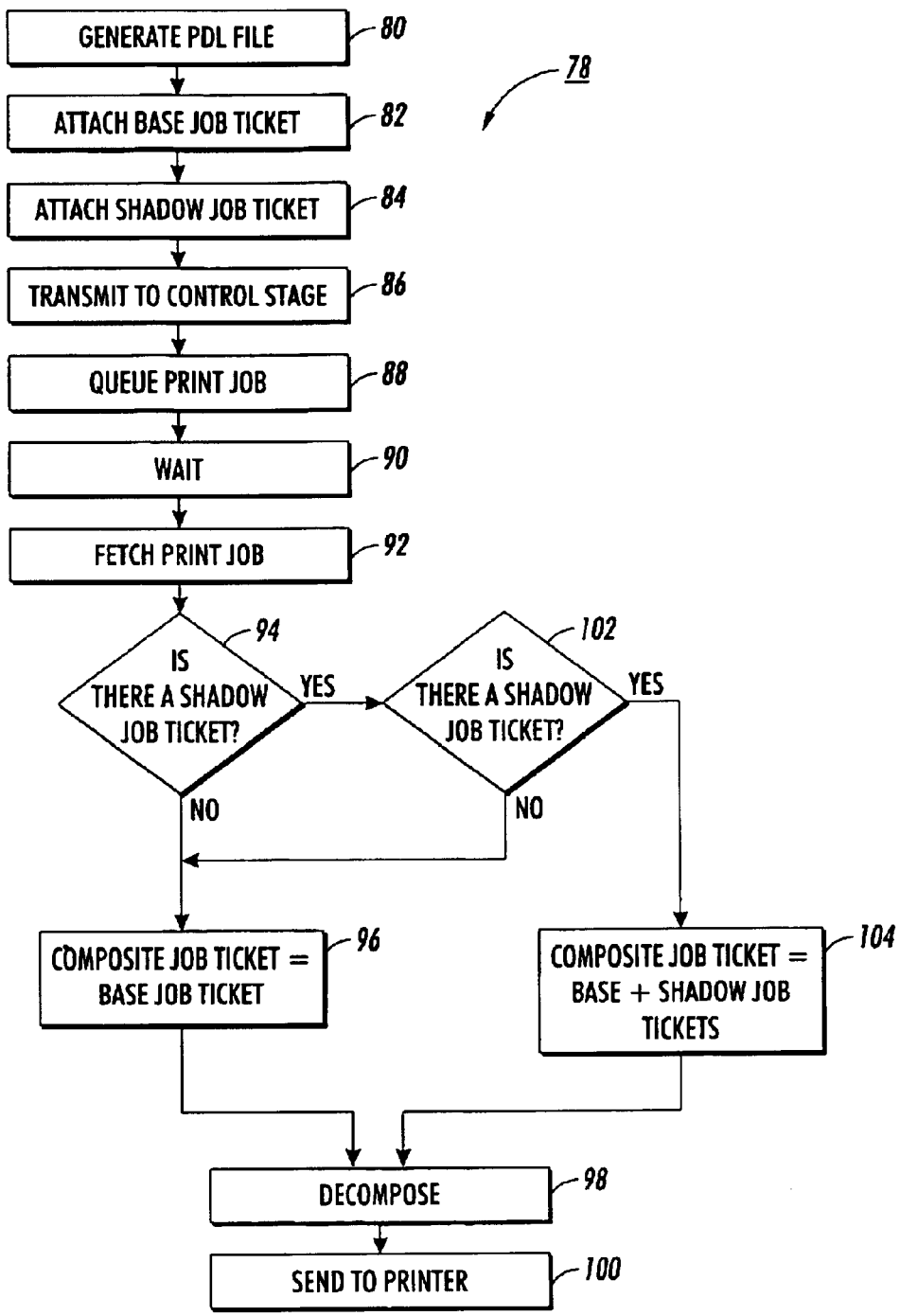
FIG. 5 shows the steps associated with printing a document having both a shadow job ticket and a base job ticket.

FIG. 5 shows the steps 78 encountered by a print job between its creation and its transmission to the printer. First, the author generates a PDL file (step 80) and attaches to it a base job ticket (step 82) and a shadow job ticket (step 84). However, as discussed above, the shadow job ticket can be sent to the control stage following the sending of the print job.

The print job, which is defined by the combination of the PDL file and its base job ticket, is then sent to the control stage (step 86). The control stage places the print job into a print queue (step 88) and waits until it reaches the head of the print queue (step 90).

Once the print job reaches the head of the print queue, the job manager fetches the print job (step 92) and determines if there is a shadow job ticket associated with that print job (step 94). If there is no such shadow job ticket, the ticket manager assembles a composite job ticket that includes the instructions from the base job ticket of the print job (step 96). The PDL file associated with the print job is then decomposed by the raster image processor (step 98). The decomposed PDL file, together with the instructions in the composite job ticket, is then sent to the printer (step 100).

If the job manager determines that there exists a shadow job ticket associated with the print job, it then determines whether the shadow job ticket is in its active state or in its inactive state (step 102). If the shadow job ticket is in its inactive state, processing continues as if there were no shadow job ticket. The ticket manager assembles a composite job ticket that includes the instructions from the base job ticket of the print job (step 96). The PDL file associated with the print job is then decomposed by the raster image processor (step 98) and sent, together with the instructions in the composite job ticket, to the printer (step 100).

If the job manager determines that the shadow job ticket is in its active state, the ticket manager assembles a composite job ticket by using the instructions provided on the shadow job ticket to supersede selected instructions on the base job ticket (step 104). The PDL file associated with the print job is then decomposed by the raster image processor (step 98) and sent, together with the instructions in the composite job ticket, to the printer (step 100).

The method of the invention also provides for the use of several shadow tickets associated with the same print job, in which case the operator can select from one of several combinations of finishing instructions by switching selected shadow job tickets to form different combinations of active and inactive shadow job tickets. In general, with n shadow job tickets, the operator can select from $2^n$ sets of finishing instructions.

Having described the invention, and a preferred embodiment thereof, what is claimed as new and secured by Letters Patent is:

1. In a document reproduction system, a method for selecting a printing instruction to be used for printing a print job, said method comprising the steps of:
   providing a base job ticket identifying said print job and having a base data field;
   providing a shadow job ticket identifying said print job and having a shadow data field corresponding to said base data field, and shadow data field having a first printing instruction encoded therein;
   determining whether said shadow job ticket is in an active state; and
   assembling a composite job ticket having a composite data field corresponding to said base data field, said composite data field having, encoded therein, a second printing instruction to be used for printing said print job, said second printing instruction being selected to be said first printing instruction if said shadow job ticket is in its active state.

2. The method of claim 1 further comprising the step of encoding a third printing instruction in said base data field, and wherein said step of assembling said composite job ticket further comprises the steps of:
   determining whether said shadow job ticket is in an active state, and
   selecting said second printing instruction to be said third printing instruction if said shadow job ticket is not in an active state.

3. The method of claim 1 wherein said step of assembling said composite job ticket comprises the steps of:
   retrieving said base job ticket and said print job from a first storage element, and
   retrieving said shadow job ticket from a second storage element.

4. A computer-readable medium having encoded therein software for generating a job ticket for use in connection with a print job, said software comprising instructions for executing the steps of:
   generating a base job ticket associated with said print job;
   generating a shadow job ticket associated with said print job; and assembling a composite job ticket from said base job ticket and said shadow job ticket, said composite job ticket being associated with said print job for use in connection with said print job, said shadow job ticket being switchable between an active and an inactive state.

5. The computer-readable medium of claim 4 wherein said instructions for executing the step of generating a base job ticket comprise instructions for executing the step of providing a base data field and said instructions for executing the step of generating a shadow job ticket comprise instructions for executing the step of providing a shadow data field corresponding to said base data field having a first printing instruction encoded thereon.

6. The computer-readable medium of claim 5 wherein said software further comprises instructions for executing the step of determining whether said shadow job ticket is in an active state.

7. The computer-readable medium of claim 6 wherein said instructions for executing the step of assembling said composite job ticket comprise instructions for executing the step of combining said shadow job ticket and said base job ticket if said shadow job ticket is in said active state.

8. The computer-readable medium of claim 7 wherein said instructions for executing the step of assembling a composite job ticket comprise instructions for executing the step of providing, on said composite job ticket, a composite data field corresponding to said base data field.

9. The computer-readable medium of claim 8 wherein said instructions for executing the step of assembling a composite job ticket further comprise instructions for executing the step of encoding, in said composite data field, a second printing instruction to be used for printing said print job, said second printing instruction being selected to be said first printing instruction if said shadow job ticket is in its active state.

10. The computer-readable medium of claim 5 wherein said software further comprises instructions for executing the step of encoding a third printing instruction in said base data field, and said instructions for executing the step of assembling said composite job ticket further comprise instructions for executing the steps of:

determining whether said shadow job ticket is in an active state; and selecting said second printing instruction to be said third printing instruction if said shadow job ticket is not in said active state.

11. The computer-readable medium of claim 4 wherein said instructions for executing the step of assembling said composite job ticket comprise instructions for executing the steps of:

retrieving said base job ticket and said print job from a first storage element; and retrieving said shadow job ticket from a second storage element.

12. An input reproduction system for generating printed output from a print job, said system comprising:

an image input stage for generating a print job having an associated base job ticket and an associated shadow job ticket, said shadow job ticket being switchable between an active state and an inactive state;

a control stage in communication with said image input stage for receiving said print job from said image input stage and generating therefrom a transformed print job;

a ticket management process, in communication with said control stage, for assembling a composite job ticket from said base job ticket and said shadow job ticket, said composite job ticket being associated with said print job for use in connection with said print job wherein said ticket management process further comprises:

a ticket inspection process for determining whether said shadow job ticket is in said active state;

a ticket composition process for combining said shadow job ticket and said base job ticket if said shadow job ticket is in said active state; and an image output stage in communication with said control stage for receiving said transformed print job and said composite job ticket and generating printed output therefrom.

13. The system of claim 12 wherein said base job ticket comprises a base data field and said shadow job ticket comprises a shadow data field corresponding to said base data field, said shadow data field having a first printing instruction encoded thereon.

14. The system of claim 13 wherein said shadow job ticket is switchable between an active state and an inactive state and said ticket management process further includes a ticket inspection process for determining whether said shadow job ticket is in an active state.

15. The system of claim 14 wherein said ticket management process comprises a ticket composition process for providing, on said composite job ticket, a composite data field corresponding to said base data field.

16. The system of claim 15 wherein said ticket composition process comprises an instruction encoding process for encoding, in said composite data field, a second printing instruction to be used for printing said print job, and said second printing instruction being selected to be said first printing instruction if said shadow job ticket is in its active state.

17. The system of claim 16 wherein said image input stage comprises an image encoding process for encoding a third printing instruction on said base data field, and said ticket management process comprises:

a ticket inspection process for determining whether said shadow job ticket is in an active state; and a ticket composition process for selecting said second printing instruction to be said third printing instruction if said shadow job ticket is not in said active state.

18. The system of claim 12 wherein said control stage further comprises a shadow job ticket cache for storing a shadow job ticket received separately from said base job ticket.

* * * * *